Nov. 17, 1959 V. WEBER ET AL 2,913,562
TEMPERATURE RESPONSIVE CONTROL
Filed Sept. 8, 1954 5 Sheets-Sheet 1

INVENTORS
Victor Weber, Hugh J. Tyler
and William J. Russell.
BY
THEIR ATTORNEY

INVENTORS
Victor Weber, Hugh J. Tyler
and William J. Russell.
BY
THEIR ATTORNEY

United States Patent Office 2,913,562
Patented Nov. 17, 1959

2,913,562

TEMPERATURE RESPONSIVE CONTROL

Victor Weber, Greensburg, Hugh J. Tyler, Pittsburgh, and William J. Russell, Jeannette, Pa., assignors to Robertshaw-Fulton Controls Company, Richmond, Va., a corporation of Delaware Application September 8, 1954, Serial No. 454,753

19 Claims. (Cl. 219—20)

This invention relates to an improved control mechanism for regulating the heat output of a heating element, more particularly, a surface heating element of an electric range.

It is a principal object of this invention to automatically regulate the heat output of the surface heating element to maintain a cooking vessel, supported thereon, at a desired temperature.

Many foods require rapid initial heating to bring the food to a predetermined temperature and thereafter require a reduced amount of heat input to maintain such predetermined temperature. It is an object of this invention to effect such a cooking operation by permitting the heating element to operate at full energy input until the the temperature of the food to be cooked reaches a predetermined value, and then reducing the energy input to the heating element to maintain the food at the proper temperature.

In accordance with the present invention, a control mechanism is provided which automatically regulates the average wattage input to the heating element to thereby regulate the heat output.

In a preferred embodiment, mechanism is provided for periodically making and breaking the circuit to the heating element and a thermostatically operated switch controls a shunt circuit which, when closed, supplies uninterrupted power to the heating element. Opening of the thermostatically controlled switch at a predetermined temperature of the cooking vessel places the supply of power to the heating element under the control of the periodic cycling mechanism. The amount of energy supplied to the heating element will then be determined by the length of the "on" period in each cycle. An additional thermostatic switch is provided for disconnecting the heater from the power source upon an excessive temperature rise at the cooking vessel. The temperature responsive means is adjustable to effect switching from the continuous energization arrangement to periodic energization arrangement and to complete deenergization at selected temperatures.

Other objects and advantages will become apparent from the following description taken in connection with the accompanying drawings wherein.

Figure 1:
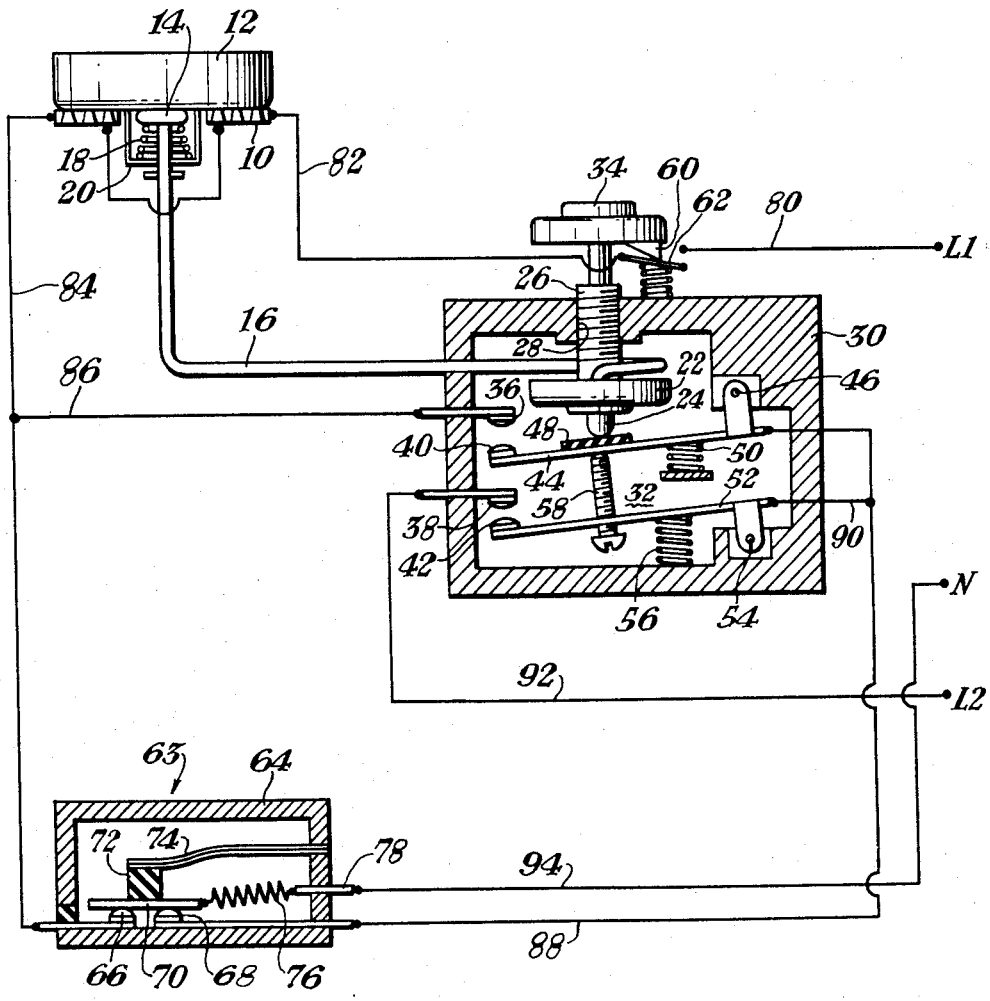
Fig. 1 is a schematic view showing the circuits for a surface heater of an electric range embodying the invention with the control devices therefor in section.

Referring more particularly to Fig. 1 of the drawings, there is shown an annular surface heating element 10 which is adapted to be supported on the top plate of an electric range (not shown) in a manner well known in the art. The heating element 10 is adapted to support a cooking vessel 12 thereon and is provided with a temperature sensing bulb 14 which is located centrally thereof.

The bulb 14 takes the form of a flat hollow container which communicates with a capillary tube 16 and is biased toward the cooking vessel 12 by a spring 18 seated on a suitable stirrup 20. The particular structure of the bulb 14 and mounting therefor is fully disclosed and claimed in our copending application Serial No. 454,754, filed September 8, 1954, now Patent No. 2,786,930.

The capillary tube 16 also communicates with an expansible power element 22 which may consist of a pair of flexible diaphragms welded together at their periphery and carrying a thrust button 24 on one side thereof. The other side of the power element 22 is secured to a stud 26 which is threaded through a suitable aperture 28 formed in a wall of a casing 30 to mount the power element 22 within a chamber 32 formed in the casing 30.

One end of the stud 26 projects out of the casing 30 and carries a manually operable knob or dial 34 which may be manipulated to rotate the stud 26 and thus effect axial adjustment of the power element 22 relative to the casing 30.

The assembly of the bulb 14, capillary tube 16, and expansible power element 22 is filled with a suitable thermal fluid which will expand upon increase in temperature sensed by the bulb 14 to effect expansion of the power element 22.

Disposed within the chamber 32 is a pair of spaced superposed fixed contacts 36, 38 which are engageable respectively by a pair of movable contacts 40, 42. The movable contact 40 is carried on the free end of a switch arm 44 which is pivoted at its other end 46 on the casing 30. The switch arm 44 underlies the thrust button 24 of the power element 22 and carries a block of insulating material 48 which is engageable by the button 24. A spring 50 acts between the arm 44 and the casing 30 to bias the switch arm 44 in a clockwise direction, as viewed in the drawing, and thus bias the movable contact 40 toward the stationary contact 36.

The movable contact 42 is carried on one end of a switch arm 52 which underlies the switch arm 44 and is pivoted at its other end 54 on the casing 30. A spring 56 acting between the casing 30 and the switch arm 52 serves to bias the latter in a clockwise direction and thus bias the movable contact 42 toward the stationary contact 38.

Abutment means is provided for transmitting movement from the switch arm 44 to the switch arm 52 for a purpose which will more fully appear hereinafter. This means takes the form of a screw 58 threaded through the switch arm 52 and extending toward the switch arm 44 to be engageable by the block 48 carried by the switch arm 44.

The dial 34 is provided with suitable cam means 60 which coact with a normally closed switch 62 to open the same in a selected position of the dial 34 and thereby establish an "off" position for the control.

The range embodying this invention also includes cyclic switch means indicated generally by the reference numeral 63 and including means for periodically making and breaking a control circuit. The cyclic switch means 63 is here shown as comprising a hollow casing 64 having a pair of fixed contacts 66, 68 mounted therein. The fixed contacts 66, 68 are positioned to be connected by a contact bridge 70 carried on a block of insulating material 72 which is secured to one end of a bimetallic strip 74. The other end of the bimetallic strip 74 is securely anchored to the casing 64. The bimetal strip 74 is positioned in the casing 64 to hold the contact bar 70 in engagement with the contacts 66, 68 when it is in its unheated condition. However, heating of the bimetal strip 74 will cause the same to flex and move the contact bar 70 out of engagement with the contacts 66, 68.

Means is provided for alternately heating and cooling the bimetal strip 74. This means is here shown as a heating coil 76 positioned within the casing 64 beneath the bimetal strip 74 and connected at one end to the contact bridge 70. The other end of the heater 76 is connected to a suitable terminal 78 which extends out of the casing 64.

The electrical connections between the various parts of the control system will be brought out in a description of the operation of the apparatus which now follows.

As shown, the apparatus is in the "off" position with no electrical energy being supplied to the surface heating element 10 or the heating coil 76. To place the apparatus in operation, the dial 34 is rotated to a desired temperature setting. Such rotation of the dial 34 will move the cam means 60 out of engagement with the switch 62 and permit the latter to close. The temperature setting movement of the dial 34 will also serve to screw the stud 26 out of the casing 30 and move the power element 22 upward, thereby permitting the movable contacts 40, 42 to move into engagement with the fixed contacts 36, 38 respectively.

The apparatus is thus conditioned to supply a steady flow of electrical energy to the surface heating element 10 through a circuit which may be traced as follows: from line wire L1 of a suitable three-wire power source through wire 80, switch 62, wire 82, heating element 10, wire 84, wire 86, contacts 36, 40, switch arm 44, wire 88, wire 90, switch arm 52, contacts 42, 38 and wire 92 to line wire L2.

When power is so supplied to the heating element 10, heat will be generated thereby to raise the temperature of the cooking vessel 12 and the food contained therein.

At this point, a circuit is also completed through the heating coil 76 of the cyclic switch means 63. This circuit may be traced as follows: from line wire L2 through wire 92, contacts 38, 42 switch arm 52, wire 90, wire 88, contact 68, contact bridge 70, heating coil 76, terminal 78, and wire 94 to neutral wire N of the three-wire power source. Thus a voltage is impressed across the heating coil 76 causing current to flow in the same to raise the temperature thereof. The temperature increase of the heating coil 76 causes the bimetal strip 74 to become heated and to flex thereby moving the contact bridge 70 out of engagement with the contact 68 and breaking the above traced energizing circuit for the heating coil 76. The heating coil 76 will then cool and permit the bimetal strip 74 to cool and return the contact bar 70 into engagement with the contacts 66, 68. Movement of the contact bar into engagement with the contact 68 again completes the energizing circuit for the heating coil 76 and the cycle of the cyclic switch means 63 is repeated.

When the contact bar 70 of the cyclic switch means 63 is in engagement with the fixed contacts 66, 68, it also serves to complete an energizing circuit for the surface heating element 10 which may be traced as follows: from line wire L1 through wire 80, switch 62, wire 82, surface heating element 10, wire 84, contact 66, contact bridge 70, contact 68, wire 88, wire 90, switch arm 52, contacts 38, 42, and wire 92 to line wire L2.

It will be apparent that the above traced energizing circuits for the top heater 10 locate the switch 36, 40, 44 in parallel circuit with the cyclic switch 66, 68, 70 so that the former effectively shunts the latter when it is in its closed position with the contacts 36, 40 in engagement with each other. Thus, as long as the contacts 36, 40 are in engagement with each other, the cyclic operation of the cyclic switch means 63 will not affect the steady energization of the surface heating element 10.

As the temperature of the cooking vessel 12 rises, the temperature of the bulb 14 will increase to cause expansion of the power element 22. Expansion of the power element 22 will move the thrust button 24 into engagement with the block 48 to swing the switch arm 44 in a counterclockwise direction against the bias of the spring 50 and thereby move the contact 40 out of engagement with the fixed contact 36.

Opening of the contacts 36, 40 will break the circuit which shunts the cyclic switch 66, 68, 70 so that current through the surface heater 10 must flow through the switch 66, 68, 70. At this stage of the operation, the contact bridge 70 is moving periodically into and out of engagement with the contacts 66, 68 by the bimetal strip 74 and the heating coil 76. Accordingly, power is supplied to the surface heating element 10 intermittently and the total amount of electrical energy supplied to the surface heating element 10 will be determined by the cycling characteristics of the switch means 63. It has been found that excellent results are obtained if the cyclic switch means 63 is constructed to close the energizing circuit for the surface heater 10 for approximately ten seconds and maintain this circuit open for twenty seconds during a thirty-second cycle of the switch means 63. It will be understood, however, that other proportions of "on" and "off" time may be used.

When the switch 36, 40 is open and power is being supplied to the surface heating element 10 under the control of the cyclic switch means 63, the average rate of energy input to the heating element 10 is substantially less than the steady input which occurs when the switch 36, 40 is closed. Thus, the heat produced by the heating element 10 and transmitted to the cooking vessel 12 is also reduced. Heat supplied to the cooking vessel 12 at this reduced rate continues to raise the temperature of the food therein, bringing it up to the desired temperature gradually.

It will be apparent that, since the thermal fluid within the bulb 14 is separated from the vessel 12 by layers of metal and air, the temperature thereof will necessarily lag behind the temperature of the vessel as the latter rises. However, when heat is being supplied to the vessel at a relatively low rate, the degree at which the temperature of the thermal fluid lags the temperature of the food will be substantially less than when heat is being supplied to the vessel 12 at a relatively high rate. Accordingly, reduction of the rate of heat input to the vessel 12 as the same approaches the desired temperature, will reduce the possibility of "overshooting" and consequent burning of the contents of the vessel 12.

As the temperature of the vessel 12 rises as a result of the intermittent energy input to the heating element 10 under the control of the cyclic switch means 63, the temperature rise is sensed by the bulb 14 and the power element 22 continues to expand. The continued expansion of the power element 22 moves the block 48 into engagement with the screw 58 carried on the switch arm 52. Further expansion of the power element 22 imparts movement to the screw 58 to move the switch arm 52 against the bias of the spring 56 and separate contacts 42, 38.

Opening of the contacts 38, 42 will break the intermittent energizing circuit for the heating element 10 to further reduce the supply of heat to the vessel 12.

It is to be noted that after the steady and intermittent energizing circuits for the heating element 10 are broken, the heating coil 76 is energized from L1 through wire 80, switch 62, wire 82, heater 10, wire 84, contact 66, contact bar 70, heater 76 and wire 94 to neutral wire N. Thus, the cyclic switch means 63 continues to cycle and is conditioned to take over the control of the energization of the heating element 10 at any time. This is particularly important since initiation of cycling in the cyclic switch means 63 may produce an initial cycle on the order of one or two minutes resulting from the necessity of bringing the bimetallic strip 74 and heating coil 76 to their operating temperatures. Preferably, the resistance of the heating coil 76 is relatively high to hold the current flowing in the last traced circuit to a minimum.

As the temperature of the vessel 12, as sensed by the bulb 14, drops, the power element 22 will contract to permit the switch arms 44, 52 to move upward under the bias of the springs 50, 56. This movement of the switch arms 44, 52 will move the contact 42 into engagement with the contact 38 to once again complete the intermittent energizing circuit for the heating element 10 and restore the relatively low rate of heat supply to the vessel 12. Usually, the restoration of the reduced rate of heat input will serve to restore the desired temperature to the vessel 12 to again cause expansion of the power element 22 and opening of the contacts 38, 42. However, in the event that the reduced heat input is not sufficient to restore the desired temperature, the power element 22 may contract sufficiently to close the contacts 36, 40 thereby completing the circuit which shunts the cyclic switch means 63 and provides a continuous supply of electric energy to the heating element 10.

It will be apparent from the foregoing that the apparatus shown in Fig. 1 is operative to bring the temperature of a cooking vessel rapidly up to a temperature approaching the desired control temperature by supplying power continuously to the heating element 10 and thereafter effecting a gradual temperature rise of the cooking vessel 12 to the selected cooking temperature by supplying power intermittently to the heating element 10, subsequent maintenance of the selected temperature of the cooking vessel 12 being effected by supplying intermittent or continuous power to the heating element 10 in response to temperature variations of the cooking vessel 12. The temperature at which the power supply to the heating element 10 is switched from continuous to intermittent is accurately determined with respect to the desired temperature of the cooking vessel 12, as selected by the setting of the dial 34, by means of the screw 58 carried on the switch arm 52. The screw 58 may be screwed into or out of the switch arm 52 to adjust the differential between the temperatures at which the switch arms 44, 52 will open their respective contacts. Thus, the screw 58 effectively adjusts the temperature span in which the cyclic switch means 63 will control the cooking operation.

Figure 2:
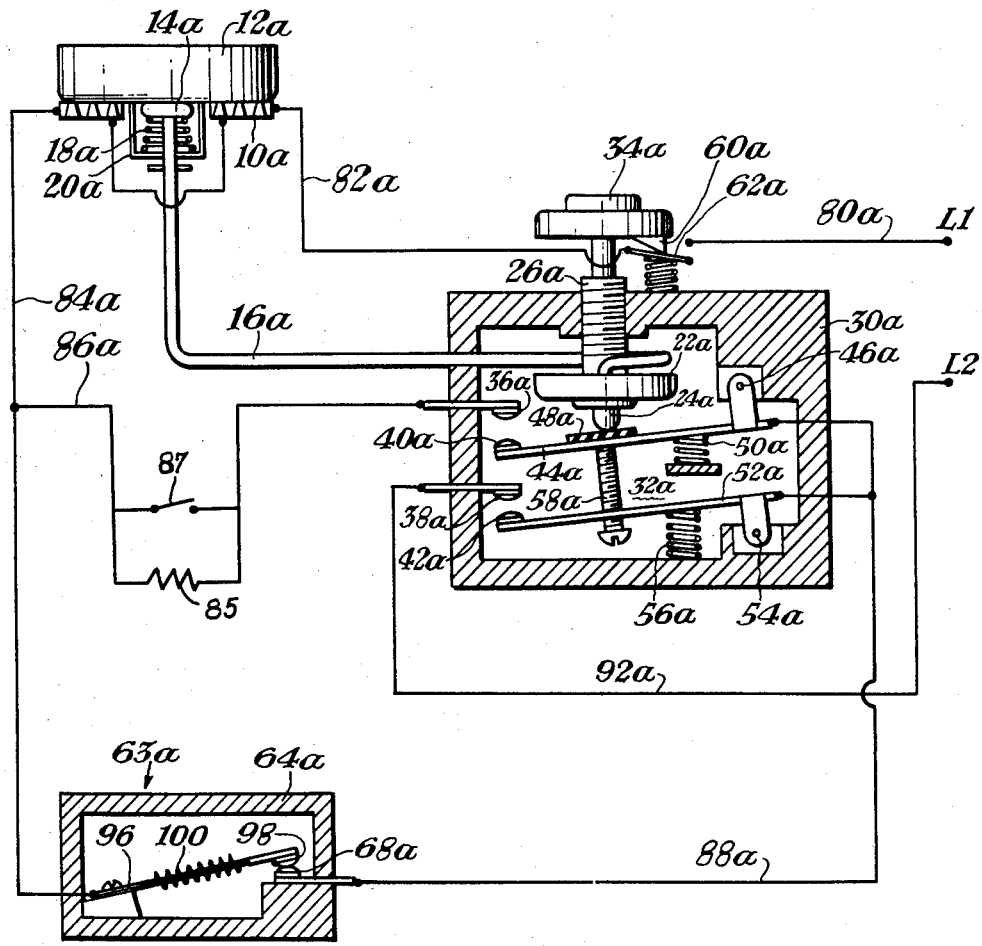
Fig. 2 is a view similar to Fig. 1 but showing a modified form of the invention.

The embodiment of the invention shown in Fig. 2, wherein parts corresponding to parts hereinbefore described are designated by corresponding reference numerals have the suffix "a," is similar to the embodiment shown in Fig. 1 but differs therefrom in the form and the electrical hookup of the cyclic switch means.

The cyclic switch means 63a of Fig. 2 comprises a casing 64a having a fixed contact 68a mounted therein. A bimetallic switch arm 96 is secured at one end to the casing 64a and carries on its other end a movable contact 98 which is engageable with the fixed contact 68a. A heating coil 100 encircles the bimetallic switch arm 96 and is connected at one end to the movable contact 98. The other end of the heating coil 100 is connected to the wire 84a which in turn is connected to the surface heating element 10a and to the fixed contact 36a of the thermostatic switch.

In the normal or unheated condition of the bimetallic switch arm 96, the contact 98 is in engagement with the fixed contact 68a so that the heating coil 100 is connected in series with the surface heating element 10a and in parallel with the thermostatic switch 36a, 40a.

When the contact 98 is in engagement with contact 68a, and the contacts 38a, 42a of the thermostatic switch are closed, an energizing circuit for the heating coil 100 is completed and may be traced as follows: from line wire L1 through wire 80a, switch 62a, wire 82a, surface heating element 10a, wire 84a, heating coil 100, contacts 98, 68a, wire 88a, switch arm 52a, contacts 42a, 38a, and wire 92a to line wire L2.

Energization of the heating coil 100 results in heating of the bimetallic switch arm 96 and warping of the same to move the contact 98 out of engagement with the contact 68a. Opening of the contacts 98, 68a breaks the energizing circuit for the heating coil 100 and permits the bimetallic switch arm 96 to cool and return the contact 98 into engagement with the fixed contact 68a. Closing of the contacts 98, 68a will again complete the energizing cricuit for the heating coil 100 and the operating cycle of the switch means 63a will be repeated. Thus, the cyclic switch means 63a will continue to make and break as long as it is connected to the source.

If desired, a switch 87 may be opened to insert in the wire 86a, a resistance 85 of sufficient ohmic value relative to the resistance of the coil 100 to cause the coil 100 to draw enough current to effect the above described cycling operation even when the contacts 36a, 40a of the thermostatic switch are closed to establish a shunt circuit across the heating coil 100. When the resistance 85 is so used, cycling of the switch means 63a will begin immediately upon movement of the dial 34a to a selected temperature setting to effect closing of the switches 60a; 36a, 40a; and 38a, 42a. Thus, the cyclic switch means 63a will be conditioned to take over control of the supply of electric energy to the surface heater 10a immediately upon opening of the thermostatic switch contacts 36a, 48a.

Operation of the apparatus shown in Fig. 2, is similar to the operation of that shown in Fig. 1, differing only in that the energizing circuit for the heating coil of the cyclic switch means 63a is broken when the power element 22a expands sufficiently to open the contacts 38a, 42a.

Figure 3:
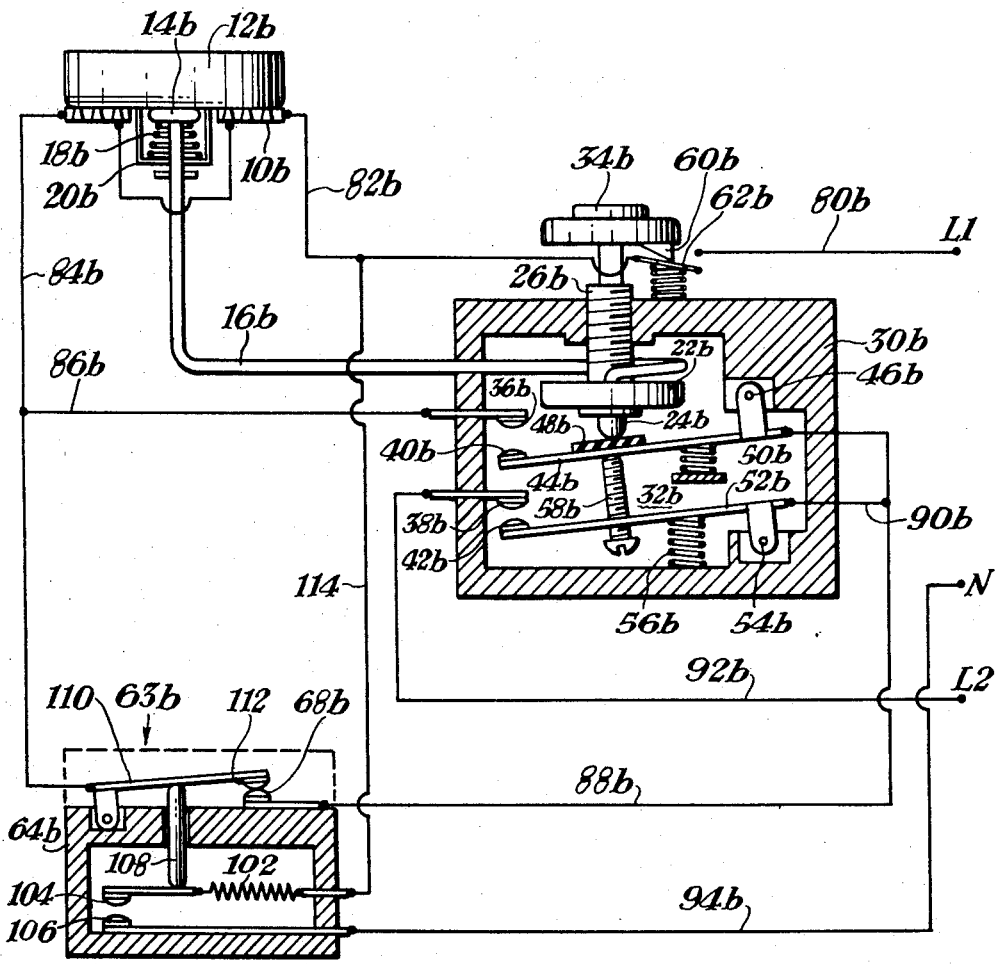
Fig. 3 is a view similar to Fig. 1 but showing another modified form of the invention.

The embodiment shown in Fig. 3, wherein parts corresponding to parts hereinbefore described are designated by corresponding reference numerals having the suffix "b," is similar to the embodiment shown in Fig. 1 but differs therefrom in the form and electrical hookup of the cyclic switch means.

The cyclic switch means 63b of Fig. 3 comprises a casing 64b having a fixed contact 68b mounted thereon. A bimetallic resistance element 102 is secured at one end to the casing 64b and carries on its other end a movable contact 104 which is engageable with a second fixed contact 106. A pin 108 slidably mounted in the casing 64b extends between the bimetallic resistance element 102 and a movable switch arm 110. The switch arm 110 carries a contact 112 which is engageable with the fixed contact 68b. The switch arm 110 is connected to the wire 84b and the fixed contact 68b is connected to the wire 88b so that the contacts 112, 68b control intermittent energization of the surface heater 10b.

To effect periodic opening and closing of the contacts 112, 68b, the bimetallic resistance element 102 is connected to the wire 82b by a wire 114 and the fixed contact 106 is connected to the wire 94b which in turn is connected to the neutral wire N of the power source.

In the normal or unheated condition of the bimetallic resistance element 102, the contact 104 is in engagement with the fixed contact 106 so that the bimetallic resistance element 102 is connected directly between line wire L1 and neutral wire N by a circuit which may be traced as follows: from line wire L1, through wire 80b, switch 62b, wire 82b, wire 114, bimetallic resistance element 102, contacts 104, 106, and wire 94b to neutral wire N.

Completion of the last traced circuit permits current to flow through the bimetallic resistance element 102 to cause heating of the same. Such heating will cause the bimetallic resistance element 102 to warp and move the contact 104 out of engagement with the contact 106 thus breaking the energizing circuit for the bimetallic resistance element and permitting the same to cool. Cooling of the bimetallic resistance element 102 will cause the same to return to its initial position and move the contact 104 into engagement with the contact 106. Closing of the contacts 104, 106 will again complete the energizing circuit for the bimetallic resistance element 102 and the operating cycle of the switch means 63b will be repeated. Thus, the cyclic switch means 63b will continue to make and break as long as the switch 62b is closed.

The pin 108 establishes a mechanical connection between the bimetallic resistance element 102 and the switch arm 110 so that making and breaking of the contacts 104 with associated movement of the bimetallic resistance element 102 will cause corresponding making and breaking of the contacts 112, 68b in the energizing circuit for the surface heater 10b.

Operation of the apparatus shown in Fig. 3 is similar to the operation of that shown in Fig. 1, differing only in that the energizing circuit for the bimetallic resistance element is connected directly across the source at all times and current flowing therein is at no time required to flow through the surface heater 10b.

Figure 4:
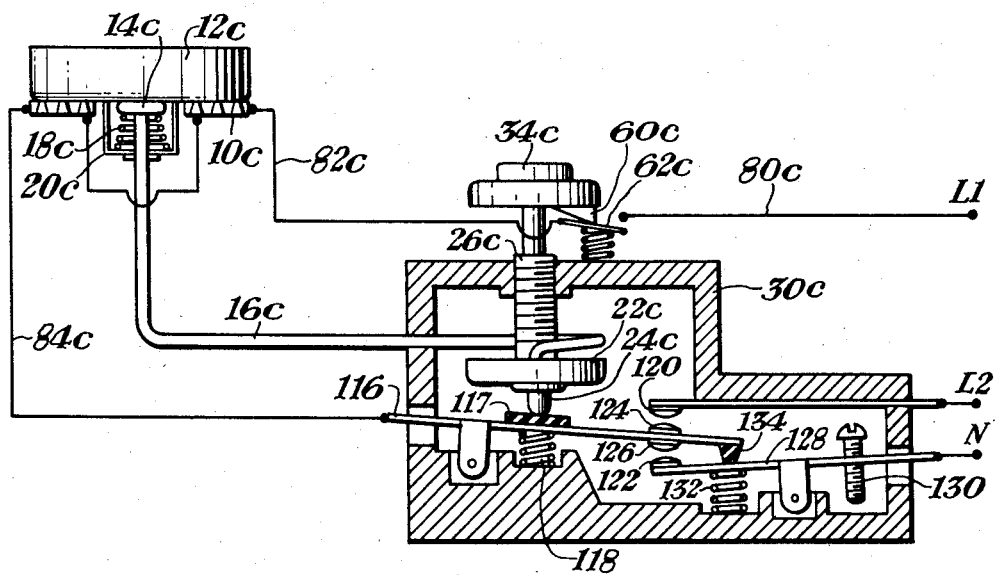
Fig. 4 is a view similar to Fig. 1 but showing another modified form of the invention.

The embodiment of the invention shown in Fig. 4, wherein parts corresponding to parts hereinbefore described are designated by corresponding reference numerals having the suffix "c," is similar to the embodiment shown in Fig. 1 in that the device responsive to the temperature of the coking vessel acts to reduce the amount of heat input to the vessel when the same reaches a predetermined temperature. However, reduction of the input to the surface heater is effected by a switching mechanism which connects the surface heater across a source of reduced voltage.

More particularly, the embodiment of the invention shown in Fig. 4 comprises a switch arm 116 pivotally mounted in the casing 30c and connected at one end to the wire 84c which in turn is connected to the surface heater 10c. The switch arm 116 underlies the expansible power element 22c and carries a block of insulating material 117 which is biased into engagement with the thrust button 24c thereof by a suitable spring 118 acting on the switch arm 116. The other end of the switch arm 116 extends between a pair of contacts 120, 122 and carries a pair of oppositely disposed contacts 124, 126 engageable with the contacts 120, 122 respectively.

The contact 122 is mounted on one end of a second switch arm 128 which carries an adjustable stop in the form of a screw 130 adjacent its other end and is pivoted intermediate its ends on the casing 30c. A spring 132 acts between the switch arm 128 and the casing 30c to normally hold the screw 130 seated on the casing 30c and thereby position the contact 122 in predetermined spaced relation with the contact 120.

The switch arm 116 extends beyond the contacts 124, 126 and carries a projection 134 on its extremity which overlies the switch arm 128.

The contact 120 is connected to line wire L2 and the switch arm 128 is connected to neutral wire N. The various circuit arrangements which these connections permit will be brought out in a description of the operation of the embodiment of Fig. 4 which follows.

As shown, the apparatus of Fig. 4 is in the "off" position with no electrical energy being supplied to the surface heating element 10c. To place the apparatus in operation, the dial 34c is rotated to a desired temperature setting. Such rotation of the dial 34c will move the cam means 60c out of engagement with the switch 62c and permit the latter to close. The temperature setting movement of the dial 34c will also serve to screw the stud 26c out of the casing 30c and move the power element 22c upward, thereby permitting the switch arm 116 to pivot under the bias of the spring 118 and move the contact 124 into engagement with the fixed contact 120.

The apparatus is thus conditioned to supply a relatively large amount of electrical energy to the surface heating element 10c through a circuit which may be traced as follows: from line wire L1 of the three-wire power source through wire 80c, switch 62c, wire 82c, heating element 10c, wire 84c, switch arm 116, and contacts 124, 120 to line wire L2. Thus, the surface heating element 10c is connected directly across line wires L1, L2 which may have a potential difference on the order of 230 volts. Accordingly, heat will be generated by the surface heating element 10c at a relatively rapid rate to raise the temperature of the cooking vessel 12c and the food contained therein.

As the temperature of the cooking vessel 12c rises, the temperature of the bulb 14c will increase to cause expansion of the power element 22c. Expansion of the power element 22c will move the thrust button 24c into engagement with the switch arm 116 to swing the same against the bias of the spring 118, thereby moving the contact 124 out of engagement with the contact 120 and moving the contact 126 into engagement with the contact 122 after having opened contacts 120 and 124.

At this point, the surface heating element 10c is energized through a circuit which may be traced as follows: from line wire L1 through wire 80c, switch 62c, wire 82c, heating element 10c, wire 84c, switch arm 116, contacts 126, 122, and switch arm 128 to neutral wire N of the power soure. Thus, the heating element 10c is connected directly across line wire L1 and neutral wire N which may have a potential difference on the order of 115 volts. When the apparatus is in this condition, the rate of energy input to the heating element 10c is substantially less than when the same is connected directly across line wires L1, L2. Thus, the heat produced by the heating element 10c and transmitted to the cooking vessel 12c is also substantially less. Heat supplied to the cooking vessel 12c at this reduced rate continues to raise the temperature of the contents thereof, bringing it up to the desired temperature gradually.

As the temperature of the vessel 12c rises as the result of the reduced energy input to the heating element 10c, the temperature rise is sensed by the bulb 14c and the power element 22c continues to expand. The continued expansion of the power element 22c moves the projection 134 on the switch arm 116 into engagement with the switch arm 128, causing the latter to be pivoted in a counterclockwise direction to move the contact 122 out of engagement with the contact 126. Separation of the contacts 126, 122 will break the last traced energizing circuit for the surface heating element 10c and the supply of heat to the vessel 12c will be terminated.

As the temperature of the vessel 12c, as sensed by the bulb 14c, drops, the power element 22c will contract to permit the switch arm 116 to move in a counterclockwise direction under the bias of the spring 118. Such movement of the switch arm 116 will raise the projection 134 and permit clockwise movement of the switch arm 128 under the bias of the spring 132 to bring the contact 122 into engagement with the contact 126 and once again complete the circuit for energizing the heating element 10c at a relatively low input rate.

Usually, restoration of the reduced rate of heat input will serve to restore the desired temperature to the vessel 12c to again cause expansion of the power element 22c and opening of the contacts 122, 126. However, in the event that the reduced input rate is not sufficient to restore the desired temperatuer, the power element 22c may contract sufficiently to open the contacts 122, 126 and subsequently close the contacts 120, 124 thereby completing the circuit which provides a relatively high input rate to the heating element 10c.

It will be apparent from the foregoing that the apparatus shown in Fig. 4 is operative to bring the temperature of the cooking vessel rapidly up to a temperature approaching the desired control temperature by supplying power at a relatively high rate to the heating element 10c and thereafter effecting a gradual temperature rise of the cooking vessel 12c to the selected cooking temperature by supplying power at a reduced rate to the heating element 10c, subsequent maintenance of the selected temperature of the cooking vessel 12c being effected by supplying power at a high or low rate to the heating element 10c in response to temperature variations of the cooking vessel 12c.

The temperature at which the power supply to the heating element 10c is switched from high to low rate is accurately determined by the setting of the dial 34c. The screw 130 carried by the switch arm 128 may be adjusted to position the contact 122 for engagement with the contact 126 after separation of the contacts 120, 124.

Figure 5:
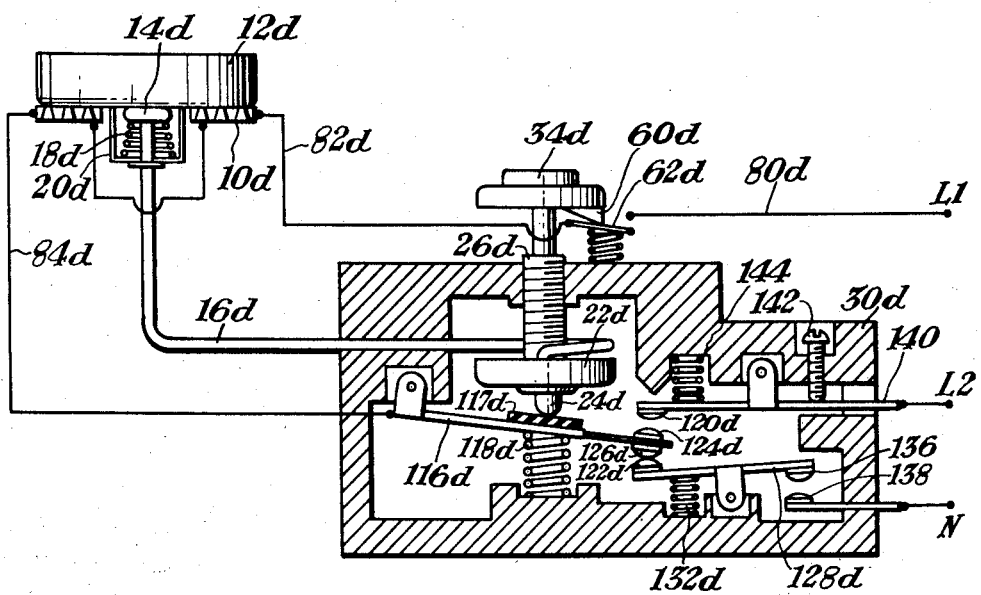
Fig. 5 is a view similar to Fig. 1 but showing another modified form of the invention.

The embodiment of the invention shown in Fig. 5, wherein parts corresponding to parts hereinbefore described are designated by corresponding reference numerals having the suffix "d," is similar to the embodiment shown in Fig. 4 but differs therefrom in the form of the switching mechanism for terminating the supply of electric energy to the surface heater.

The switch arm 128d of Fig. 5 carries the contact 122d on one end thereof for engagement with the contact 126d but carries a second contact 136 on the other end thereof in place of the adjusting screw 130 shown in Fig. 4. The contact 136 is movable with the switch arm 128d and is engageable with a fixed contact 138 which is connected to the neutral wire N of the three-wire power source.

The contact 120d which is engageable with the contact 124d on the switch arm 116d is carried on a lever 140. The lever 140 is pivotally mounted on the casing 30d and is biased into engagement with an adjusting screw 142 by a spring 144. It will be apparent that the adjusting screw 142 controls the position of the contact 120d relative to the casing 30d and thus may be manipulated to effect proper positioning of contact 120d relative to the contact 124d so that the contact 126d will not engage contact 122d until after contacts 120d, 124d have been separated.

Operation of the apparatus shown in Fig. 5 is similar to the operation of that shown in Fig. 4, differing only in that the energizing circuit which supplies energy to the heating element 10d at a relatively low rate is broken by separation of the contacts 136, 138 rather than by separation of the contacts 122d, 126d. The contacts 136, 138 are normally held in engagement with each other by the bias of the spring 132d and are moved out of engagement with each other upon excessive expansion of the power element 22d in response to a temperature at the cooking vessel 12d which is higher than the selected control temperature.

Figure 6:
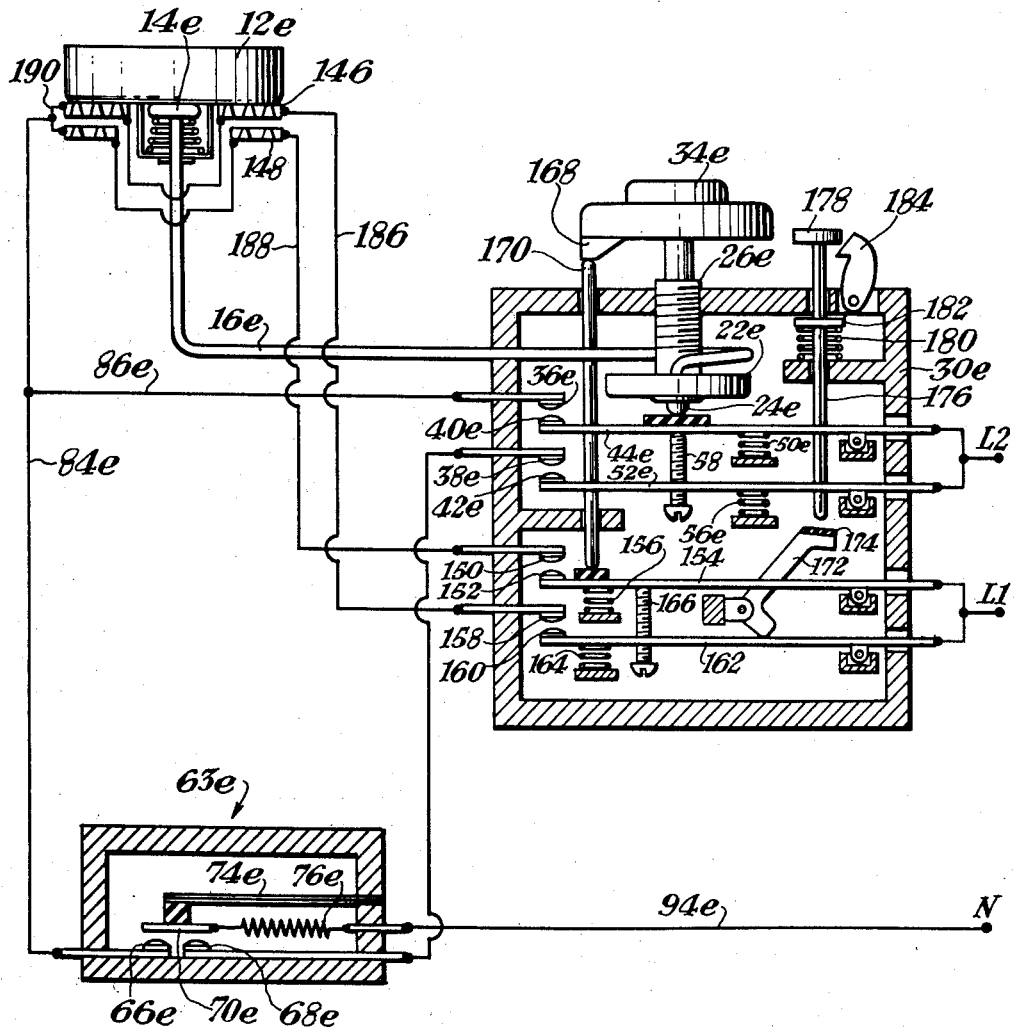
Fig. 6 is a view similar to Fig. 1 but showing another modified form of the invention.

The embodiment of the invention shown in Fig. 6, wherein parts corresponding to parts hereinbefore described are designated by corresponding reference numerals having the suffix "e," is similar to the embodiment shown in Fig. 1 but differs therefrom in the form of the surface heater and also in the form of the manually operable switch which connects the surface heater directly to the power source.

The surface heater of Fig. 6 takes the form of two heating elements 146, 148 connected in parallel between the wire 84e and the line wire L1 of the three-wire power source. Connected in series with the heating element 148 is a first manually operable switch means comprising a fixed contact 150 and a movable contact 152 which is carried on a switch arm 154. The switch arm 154 is pivoted in the casing 30e and is connected to the line wire L1. A spring 156 acting between the switch arm 154 and the casing 30e biases the switch arm 154 in a direction to normally hold the contact 152 in engagement with the contact 150.

Connected in series with the heating element 146 is manually operable switch means comprising a fixed contact 158 mounted on the casing 30e to be engageable by a movable contact 160. The contact 160 is carried on a switch arm 162 pivoted in the casing 30e beneath the switch arm 154. The switch arm 162 is connected to line wire L1 and is biased by a spring 164 to normally hold the contact 160 in engagement with the contact 158. A screw 166 is threaded through the switch arm 162 and abuts the switch arm 154 for a purpose which will more fully appear hereinafter.

Manually operable means is provided for moving the contacts 152, 160 out of engagement with the contacts 150, 158 respectively when the dial 34e is moved to a predetermined position to provide an "off" position for the control wherein the heating elements 146, 148 will be disconnected from the power source. To this end, a cam 168 is formed on the underside of the dial 34e to be engageable with one end of a push rod 170. The push rod 170 is slidably mounted in the casing 30e and the other end thereof extends into engagement with the switch arm 154. The push rod 170 is of sufficient length to hold the contact 152 out of engagement with the contact 150 when the outer end of the rod is in engagement with the cam 168. Rotation of the dial 134e to move the cam 168 out of engagement with the push rod 170 will permit the switch arm 154 to move under the bias of the spring 156 to position the contact 152 in engagement with the contact 150. Since the screw 166 carried by the switch arm 162 abuts the switch arm 154, the switch arm 162 will follow the movements of the switch arm 154 so that the cam 168 and push rod 170 also serve to operate the contacts 158, 160.

Operation of the apparatus of Fig. 6 thus far described is similar to the operation of that shown in Fig. 1 with the contacts 150, 152, 158, 160 performing the same function as the switch 62 of Fig. 1 and the parallel connected heating elements 146, 148 operating in the same manner as the surface heater 10 of Fig. 1. However, if a relatively small mass of food is to be cooked in the vessel 12e, it may be desirable to utilize only one of the heating elements 146, 148. Accordingly, manually operable means is provided for latching the contacts 158, 160 in open position to disconnect the heating element 146 from the power source.

This means takes the form of a bell crank lever 172 pivoted in the casing 30e with one leg thereof extending into engagement with the switch arm 162. The other leg of the bell crank lever 172 extends upward and is provided with a suitable seating surface 174 which is engageable by a plunger 176. The plunger 176 is slidably mounted in the casing 30e with one end thereof projecting out of the casing and carrying a push button 178.

The plunger 176 is biased away from the bell crank lever 172 by a spring 180 acting between the casing 30e and a collar 182 formed on the plunger 176. The collar 182 is engageable with a wall of the casing 30e to form a limit stop and prevent ejection of the plunger 176 from the casing.

The spring 180 normally holds the plunger 176 out of engagement with the bell crank lever 172 so that the contacts 150, 152, 158, 160 will operate solely under the control of the cam 168 and push rod 170. However, when the plunger 176 is moved downward against the bias of the spring 180 by manipulation of the push button 178, the inner end of the plunger 176 engages the seating surface 174 on the bell crank lever 172, pivoting the bell crank lever 172 and imparting counterclockwise movement to the switch arm 162. This movement of the switch arm 162 moves the contact 160 out of engagement with the contact 158 and disconnects the heating element 146 from the line wire L1.

To maintain the heating element 146 in its inoperative condition, latching means is provided for holding the plunger 176 in its depressed position to maintain the contacts 158, 160 out of engagement with each other. To this end, a hook latch 184 is pivoted on the casing 30e adjacent the push button 178. The hook latch 184 is adapted to be hooked over the top of the push button 178 when the same is depressed to retain it in its depressed position until the hook latch 184 is manually released.

In operation, rotation of the dial 34e to move the cam 168 out of engagement with the push rod 170 will permit the switch arms 154, 162 to move in a clockwise direction under the bias of the springs 156, 164 and close contacts 150, 152, 158, 160. The heating element 146 is then connected between wire 84e and line wire L1 through a circuit which may be traced as follows: from line wire L1 through switch arm 162, contacts 160, 158, wire 186, and heating element 146 to wire 84e.

The heating element 148 is connected between line wire L1 and wire 84e through a circuit which may be traced as follows: from line wire L1 through switch arm 154, contacts 152, 150, wire 188, heating element 148, and wire 190 to wire 84e.

It will be apparent from the foregoing that operation of the apparatus of Fig. 6 is similar to that of Fig. 1, differing only in that portions of the surface heater may be manually selected for use in the heating operation.

While only six embodiments of the invention have been herein shown and described, it will be obvious to those skilled in the art that the invention may be variously embodied and that changes may be made in the construction and arrangement of parts without departing from the scope of the invention as defined in the appended claims.

We claim:

1. A control mechanism for an electric heater assembly having a surface heating element adapted for heating a vessel and a source of electric energy comprising, circuit means electrically connected in series relation to the ends of the surface heating element and to the source of electric energy and including a pair of switches connected in parallel circuit, one of said pair of switches being normally closed to provide a continuous supply of electric energy to the heating element for heating the vessel, means for periodically moving the other of said pair of switches between open and closed positions, means responsive to the temperature of the vessel for opening said one switch when a predetermined temperature is attained to supply electric energy to the heating element intermittently under the control of said other switch, and a third switch in circuit with said other switch and operatively connected to said temperature responsive means to be opened for terminating the supply of electric energy to the heating element in response to a second predetermined temperature.

2. Mechanism as claimed in claim 1 wherein said temperature responsive means includes sensing means adjacent said heater and engageable by a cooking vessel supported thereon, an expansible element remote from said sensing means and adapted to expand and contract in response to variations in temperatures sensed thereby, means defining an operative connection between said expansible element and said one and third switches, and means for adjusting said expansible element to set the temperatures at which said one and third switches will be actuated.

3. In an electric heater assembly having a surface heater adapted for heating a cooking vessel, the combination comprising circuit means for connecting the heater to a source of electric energy and including a pair of switches connected in parallel circuit, one of said pair of switches being operable between open and closed positions and being normally closed to provide a continuous supply of electric energy to the heater for heating the vessel, said other switch including a deformable bimetallic element having a contact movable therewith and a fixed contact engageable by said movable contact, electric heating means operatively associated with said bimetallic element and adapted when energized for heating and warping the same, circuit means for energizing said heating means when said movable contact is in engagement with said fixed contact, and means responsive to the temperature of the vessel and operatively connected to said one switch for actuating said one switch between open and closed positions.

4. In an electric heater assembly having a surface heater adapted for heating a cooking vessel, the combination comprising circuit means for connecting the heater to a source of electric energy and including a pair of switches connected in parallel circuit, one of said pair of switches being operable between open and closed positions and being normally closed to provide a continuous supply of electric energy to the heater for heating the vessel, means for periodically moving the other of said pair of switches between open and closed positions, said last named means including a deformable bimetallic element having a contact movable therewith and a fixed contact engageable by said movable contact, a heater coil operatively associated with said bimetallic element and adapted when energized for heating and warping the same, said coil being connected to said movable contact, circuit means for energizing said coil when said movable contact is in engagement with said fixed contact, and means responsive to the temperature of the vessel for operating said one switch between open and closed positions and for opening said one switch when a predetermined temperature is attained to supply electric energy to the surface heater intermittently under the control of said other switch.

5. An electric heater assembly as claimed in claim 4 wherein said last named circuit means is adapted to be continuously connected to a source of electric energy.

6. An electric heater assembly as claimed in claim 4 and including a third switch in circuit with said other switch and operatively connected to said temperature responsive means to be opened for terminating the supply of electric energy to said surface heater in response to a second predetermined temperature.

7. An electric heater assembly as claimed in claim 6 wherein said last named circuit means is adapted to be connected to a source of electric energy independently of said third switch.

8. A control mechanism for an electric heater assembly having a surface heating element adapted for heating a vessel and a source of electric energy comprising circuit means for connecting the surface heating element to the source of electric energy, said circuit means being electrically connected in series relation to the ends of the surface heating element and including a pair of switches connected in parallel circuit, one of said pair of switches being normally closed to provide a continuous supply of electric energy to the element for heating a vessel supported thereby, means for periodically moving the other of said pair of switches between open and closed positions, a third switch in circuit with said other switch, means responsive to the temperature of the vessel and including an expansible element operatively connected to said one switch for opening said one switch when a predetermined temperature is attained to supply electric energy to the element intermittently under the control of said other switch, and means for operatively connecting said expansible element to said third switch for opening the same and terminating the supply of electric energy to the element in response to a second predetermined temperature.

9. Mechanism as claimed in claim 8 wherein said one switch and said third switch are mounted in a common casing, said third switch being operatively engageable by said one switch after the latter is moved to open position.

10. Mechanism as claimed in claim 8 wherein means is provided for adjusting said temperature responsive means to select the first said predetermined temperature.

11. An electric heater assembly comprising a surface heater adapted for heating a cooking vessel and including a plurality of electrical resistance units connected in parallel, circuit means for connecting said heater to a source of electric energy and including a pair of switches connected in parallel circuit, one of said pair of switches being normally closed to provide a continuous supply of electric energy to said heater for heating a vessel supported thereby, means for periodically moving the other of said pair of switches between open and closed positions, means responsive to the temperature of the vessel for opening said one switch when a predetermined temperature is attained to supply electric energy to said heater intermittently under the control of said other switch, a third switch in circuit with said other switch and operatively connected to said temperature responsive means to be opened for terminating the supply of electric energy to said heater in response to a second predetermined temperature, switch means in series with each of said resistance units, and manually operable means for selectively opening said switch mean for disconnecting a selected number of said units from said source.

12. An electric range as claimed in claim 11 wherein said switch means comprises a pair of switch arms biased to circuit closing position, said manually operable means comprising a plunger for moving one of said switch arms to open position, latching means for holding said one switch arm in said open position, a rotatable member, and cam means operatively associated with said rotatable member for moving both said switch arms to open position.

13. An electric heater assembly comprising a surface heater adapted for heating a cooking vessel and being connected at one end to one wire of a three-wire source of electric energy, a pair of switches connected in parallel circuit, said parallel circuit being connected to the other end of the heater, one of said pair of switches including a pair of fixed contacts and a contact bridge, means for periodically moving said contact bridge into and out of engagement with said fixed contacts, said last named means including a deformable bimetallic element operatively connected to said contact bridge for actuating the same, and a heater coil operatively associated with said bimetallic element and adapted when energized for heating and warping the same, one end of said coil being connected to said contact bridge, the other end of said coil being connected to the neutral wire of the three-wire source of electric energy, a third switch in series with said parallel circuit and the third wire of the three-wire source, means responsive to the temperature of the vessel for opening the other of said pair of switches when a predetermined temperature is attained to supply electric energy to said surface heater intermittently under the control of said one switch, said third switch being operatively connected to said temperature responsive means to be opened for terminating the supply of electric energy to the surface heater in response to a second predetermined temperature.

14. In a control apparatus for a surface heating element energized from a source of electric power and adapted to heat a cooking vessel, the combination comprising a first contact, a movable contact arm biased into engagement with said first contact for energizing the heating element from the source through a first electrical circuit at a predetermined rate, a second contact engageable by said contact arm for energizing the heating element from the source of power through a second electrical circuit at a reduced rate, thermally responsive means operatively connected to said movable contact arm for moving said movable contact arm out of engagement with said first contact and into engagement with said second contact at a first predetermined temperature, switch means operable between positions and operatively disposed in the second circuit for controlling the second circuit, and means operatively connected to said temperature responsive means for operating said switch means to one position to break the second circuit in response to a second preselected temperature.

15. A control apparatus as claimed in claim 14 wherein said switch means comprises a fixed contact and a switch arm biased into operative engagement therewith, said switch arm carrying said second contact and being movable against its bias by said movable contact arm.

16. In a control apparatus for a surface heating element energized from a source of electric power and adapted to heat a cooking vessel, the combination comprising a first contact, a movable contact arm biased into engagement with said first contact and adapted for energizing the heating element from the source of electric power through a first electrical circuit at a predetermined rate, a second contact engageable by said contact arm and adapted for energizing the heating element from the source of power through a second electrical circuit at a reduced rate, thermally responsive means including a movable element operatively connected to said movable contact arm for moving said movable contact out of engagement with said first contact and into engagement with said second contact at a first predetermined temperature, and abutment means carried by said movable contact arm and engageable with said second contact for moving said second contact out of engagement with said contact arm upon a further rise in temperature.

17. A control for electric heaters as claimed in claim 16 wherein said second contact is carried on a lever arm biased to a first position, and said abutment means comprise an extension of said contact arm and are engageable with said lever arm for moving said lever arm against its bias to a second position.

18. A control mechanism for a surface heating element energized from a source of electric power and adapted to heat a cooking vessel; the combination comprising a first electrical circuit adapted to be connected in series relation to the ends of the heating element whereby the heating element is energized at a predetermined rate; a second electrical circuit adapted to be connected in series relation to the ends of the heating element whereby the heating element is energized at a reduced rate; switch means operatively connected in said first and second circuits and having one position for connecting said first circuit to the heating element, a second position for connecting said second circuit to the heating element, and a third position for disconnecting said first and second circuits from the heating element; and temperature responsive means including an operative connection to said switch means for moving said switch means from the one position to the second position in response to a first selected temperature condition and for moving said switch means from the second position to the third position in response to a second selected temperature condition.

19. A control mechanism for a surface heating element energized from a three-wire source of power and adapted to heat a cooking vessel; the combination comprising a first electrical circuit adapted to be connected to two line wires of the source of power; a second circuit adapted to be connected to one line wire and a neutral wire of the source of power; switch means movable between positions and adapted to be operatively connected to the heating element and to the first and second sources of power, said switch means having a first position adapted for connecting the heating element to said first electrical circuit, a second position adapted for connecting the heating element to said second electrical circuit, and a third position adapted for disconnecting the heating element from said first and second electrical circuits; and temperature responsive means operatively connected to said switch means for moving said switch means from the first position to the second position at a first predetermined temperature and from the second position to the third position at a second predetermined temperature.

(References on following page)

References Cited in the file of this patent

UNITED STATES PATENTS

| | | |
|---|---|---|
| 2,210,947 | Myers et al. | Aug. 13, 1940 |
| 2,228,956 | Helland | Jan. 14, 1941 |
| 2,269,112 | Jepson et al. | Jan. 6, 1942 |
| 2,399,423 | Bletz | Apr. 30, 1946 |
| 2,403,824 | Newell | July 9, 1946 |
| 2,410,013 | Clark | Oct. 29, 1946 |
| 2,434,467 | McCormick | Jan. 13, 1948 |
| 2,435,530 | Candor | Feb. 3, 1948 |
| 2,447,032 | Shann | Aug. 17, 1948 |
| 2,500,061 | Clark | Mar. 7, 1950 |
| 2,541,314 | Weber et al. | Feb. 13, 1951 |
| 2,675,455 | Richardson | Apr. 13, 1954 |
| 2,767,293 | Jordan | Oct. 16, 1956 |
| 2,798,929 | Wojcik | July 9, 1957 |